United States Patent [19]

Tan et al.

[11] Patent Number: 5,409,385

[45] Date of Patent: Apr. 25, 1995

[54] I/O CARD AND CONNECTION MECHANISM THEREOF

[75] Inventors: Haw-Chan Tan, Diamond Bar; Yuan-Chieh Lin, Lake Forest, both of Calif.

[73] Assignee: Genrife Company Limited, Hong Kong

[21] Appl. No.: 133,512

[22] Filed: Oct. 7, 1993

[51] Int. Cl.⁶ .............................................. H01R 9/09
[52] U.S. Cl. ..................................................... 439/76
[58] Field of Search .......................... 439/76, 68, 328; 235/492, 487, 488

[56] References Cited

U.S. PATENT DOCUMENTS

| | | | |
|---|---|---|---|
| 4,798,946 | 1/1989 | Fujii et al. | 235/492 |
| 4,857,005 | 8/1989 | Kikuchi et al. | 439/140 |
| 5,016,086 | 5/1991 | Inoue et al. | 235/492 |
| 5,038,250 | 8/1991 | Uenaka et al. | 235/492 |
| 5,040,994 | 8/1991 | Nakamoto et al. | 439/76 |
| 5,160,275 | 11/1992 | Nakamura et al. | 439/328 |
| 5,207,586 | 5/1993 | MacGregor et al. | 439/76 |
| 5,242,310 | 9/1993 | Leung | 439/76 |
| 5,244,397 | 9/1993 | Anhalt | 439/101 |

Primary Examiner—P. Austin Bradley
Assistant Examiner—Chuck Y. Mah

[57] ABSTRACT

An I/O card (10) includes an internal PC board (26) attached to the frame means (12, 18) which extend along the edges of the PC board (26). A top panel (60) and a bottom panel (40) sandwich the frame (12, 18) and its associated PC board (26) therebetween. A socket connector (34) is positioned at the rear end of the I/O card (10). Oppositely, a specifically shaped and dimensioned opening (21) extends through the front wall (14) of the frame (12) in a front-to-end direction whereby a projecting section (29) of the PC board (26) extends into the opening (21). Two rows of traces (31) are staggeringly positioned respectively on opposite surfaces of the PC board (26) along the projecting section (29) so that when a card edge cable connector (70) is adapted to be snugly inserted into the opening (21) of the I/O card (10), the projecting section (29) of the PC board (26) is electrically and mechanically engaged within the card edge connector (70) for communication between the computer and the corresponding peripheral.

11 Claims, 8 Drawing Sheets

I/O CARD AND CONNECTION MECHANISM THEREOF

BACKGROUND OF THE INVENTION

1. Field of The Invention

The invention relates to I/O cards assembly, especially to connection mechanism of an external cable connector and an I/O section of such card assembly.

2. The Prior Art

The conventional IC or memory card/cartridge generally includes a connector or connection area positioned along an edge thereof to engage with an external memory or IC card connector for signal communication in and out, for examples, U.S. Pat. Nos. 4,531,176, 4,780,791, 4,798,946, 4,849,944, 4,857,005, 4,864,116, 4,872,091, 4,890,197, 4,893,001, 4,909,742, 4,941,835, 5,038,250 and 5,061,845. Recently, I/O cards are gradually and popularly used in computer industry. The I/O card generally comprises two different connectors at two opposite ends wherein one is a standard 68 pins socket connector which is commonly used in the traditional memory card and is adapted to mate with an external traditional memory card connector mounted on the mother board in the computer. The other is a 9 or 15 positions Input/Output (I/O) connector, even though it has not been standardized, which is designedly adapted to mate with a complementary connector connected to an external cable for peripherals that work in conjunction with the computer, for examples, U.S. Pat. Nos. 5,207,586 and 5,242,310.

Because of the growing competition in computer industry, the price becomes an important consideration for the manufacturer. Hence, to lower the cost of the components is the goal for a computer manufacture and his associated component vendors. It can be understood that in aforementioned U.S. Pat. No. 5,207,586 to MacGregor, the I/O connector is designedly integral with the frame of the card for reducing the number of the parts and eliminating some fastening job thereof partially for cost considerations.

Therefore, an object of the present invention is to provide an I/O card which has a simplified structure or less parts for low cost to, at its I/O end, mate with an external cable of peripherals. The present invention eliminates the I/O connector used in the prior art I/O card by arranging two terminal arrays staggering on opposite sides of the internal PC board within an opening at the I/O end of the I/O card instead thereof to mate with an edge card type connector connected to an external peripheral cable.

SUMMARY OF THE INVENTION

The present invention is to provide an I/O card including an internal PC board attached to a frame which extends along the edges of the PC board. A top panel and a bottom panel sandwich the frame and its associated PC board therebetween. A standard 68 pins socket connector is positioned at the rear end of the I/O card. Oppositely, a specifically shaped and dimensioned opening extends through the front wall of the frame in a front-to-end direction whereby a portion of the front end region of the PC board extends into the opening. Two rows of traces 31 are staggeringly positioned respectively on opposite surfaces of the PC board along the front end region so that when a card edge-like connector 70, which is connected to a cable for connection with a peripheral, is adapted to be snugly inserted into the opening of the I/O card, the forward projecting portion of the PC board is electrically and mechanically engaged with the card edge connector of the cable for communication between the computer and the corresponding peripheral.

DETAILED DESCRIPTION OF THE PREFERRED EMBODIMENT

References will now be made in detail to the preferred embodiments of the invention. While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by appended claims.

Figure 1:
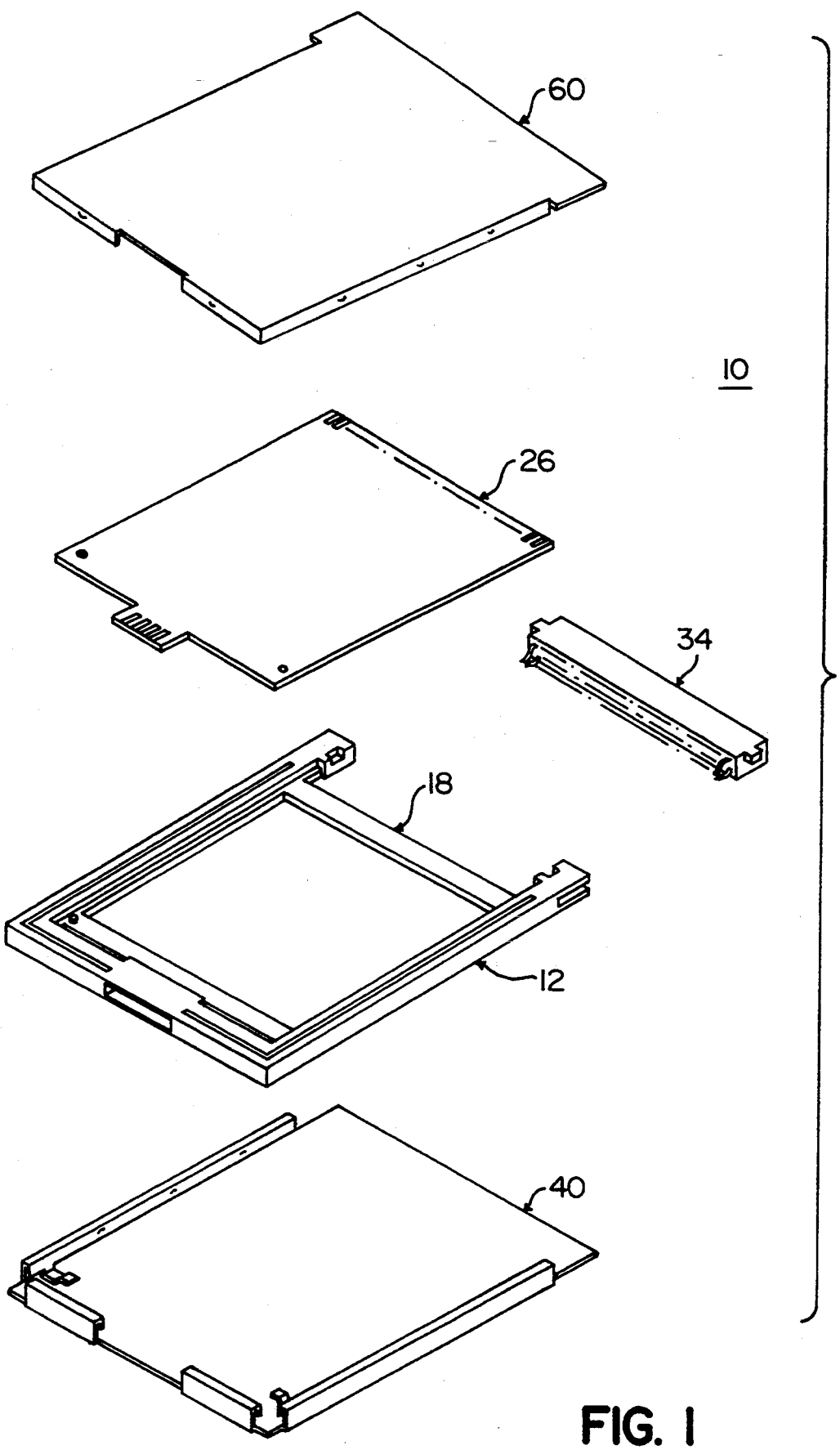
FIG. 1 is an exploded perspective view of the presently preferred embodiment of an IC card.
Figure 2:
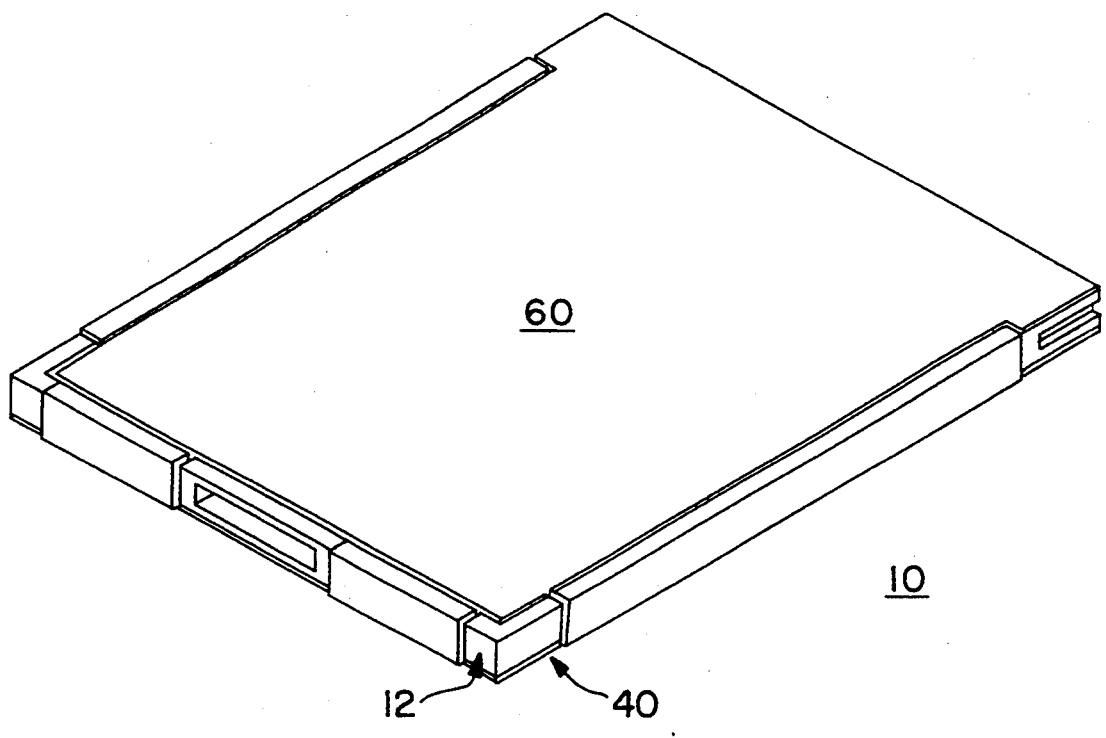
FIG. 2 is a perspective view of the assembled IC card of FIG. 1.
Figure 3:
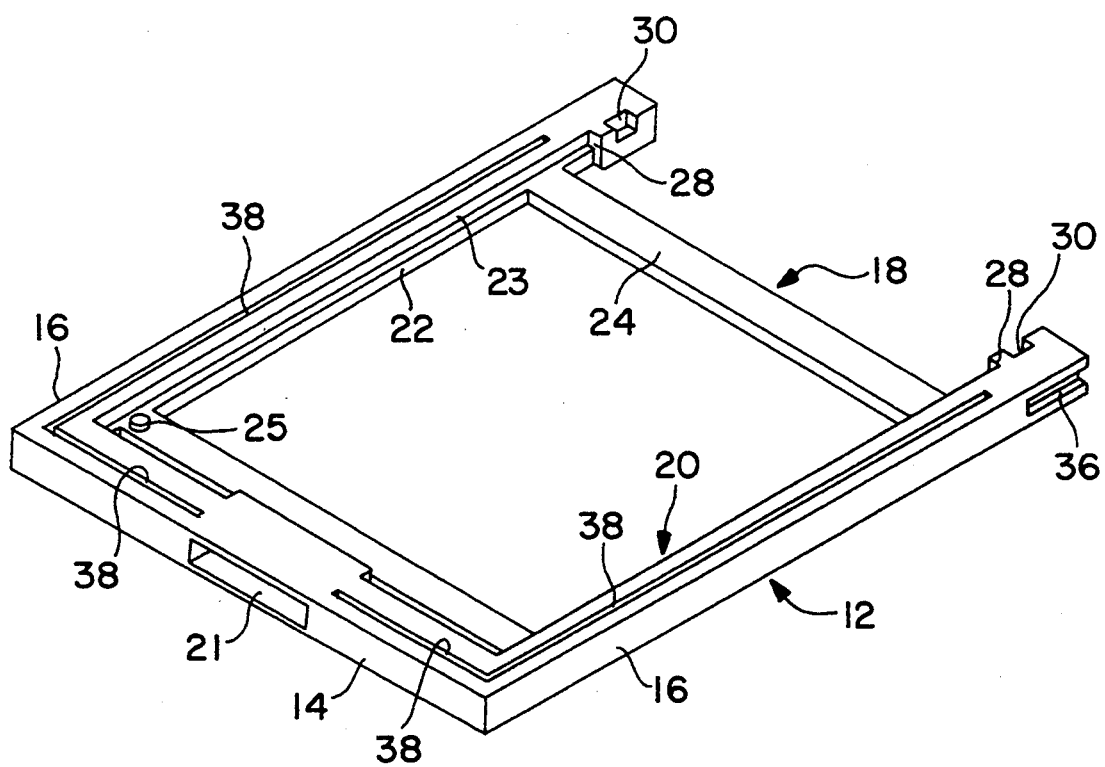
FIG. 3 is a perspective view of the main frame with the associated auxiliary frame of the IC card of FIG. 1.

It will be noted here that for a better understanding, like components are designated by like reference numerals throughout the various figures. Attention is now directed to FIGS. 1-3 where the subject I/O card generally designated 10, has a U-shaped main frame 12 including a front wall 14 and two side walls 16 rearward extending from two opposite side ends of the front wall 14, respectively. An auxiliary frame 18 is integrally formed in a central cavity 20 of the main frame 12 formed by the front wall 14 and two side walls 16.

The auxiliary frame 18 includes a pair of side bars 22 integrally and parallel extending respectively from the inner side surfaces of the corresponding side walls 16 of the main frame 12 longitudinally. Two reinforcement bars 24 are respectively and laterally connected between proximate two opposite ends of the side bars 22.

The top surface of the side bar 22 of the auxiliary frame 18 is substantially lower than that of the corresponding side wall 16 of the main frame 12, thus forming a recess 23 therebetween for reception of the side edge region of a PC board 26 therein so that such PC board 26 may lie between two side walls 16 of the main frame 12 and on the top of the auxiliary frame 18. A shoulder or a step 28 is formed at the end of each side wall 16 of the main frame 12 to incorporate the front wall 14 for preventing the PC board 26 from moving in the front-to-end direction. Accordingly, the PC board 26 in the cavity 20 is restrained by the front wall 14 and two side walls 16 from horizontal movement of any direction.

Figure 7:
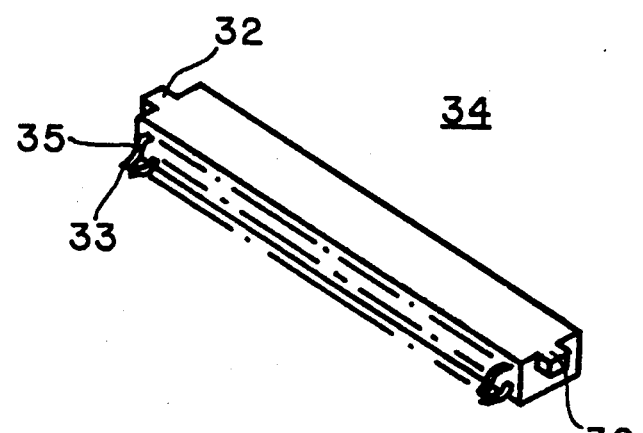
FIG. 7 is a perspective view of the standard socket connector of the IC card of FIG. 1 for used with an external memory card connector.
Figure 8:
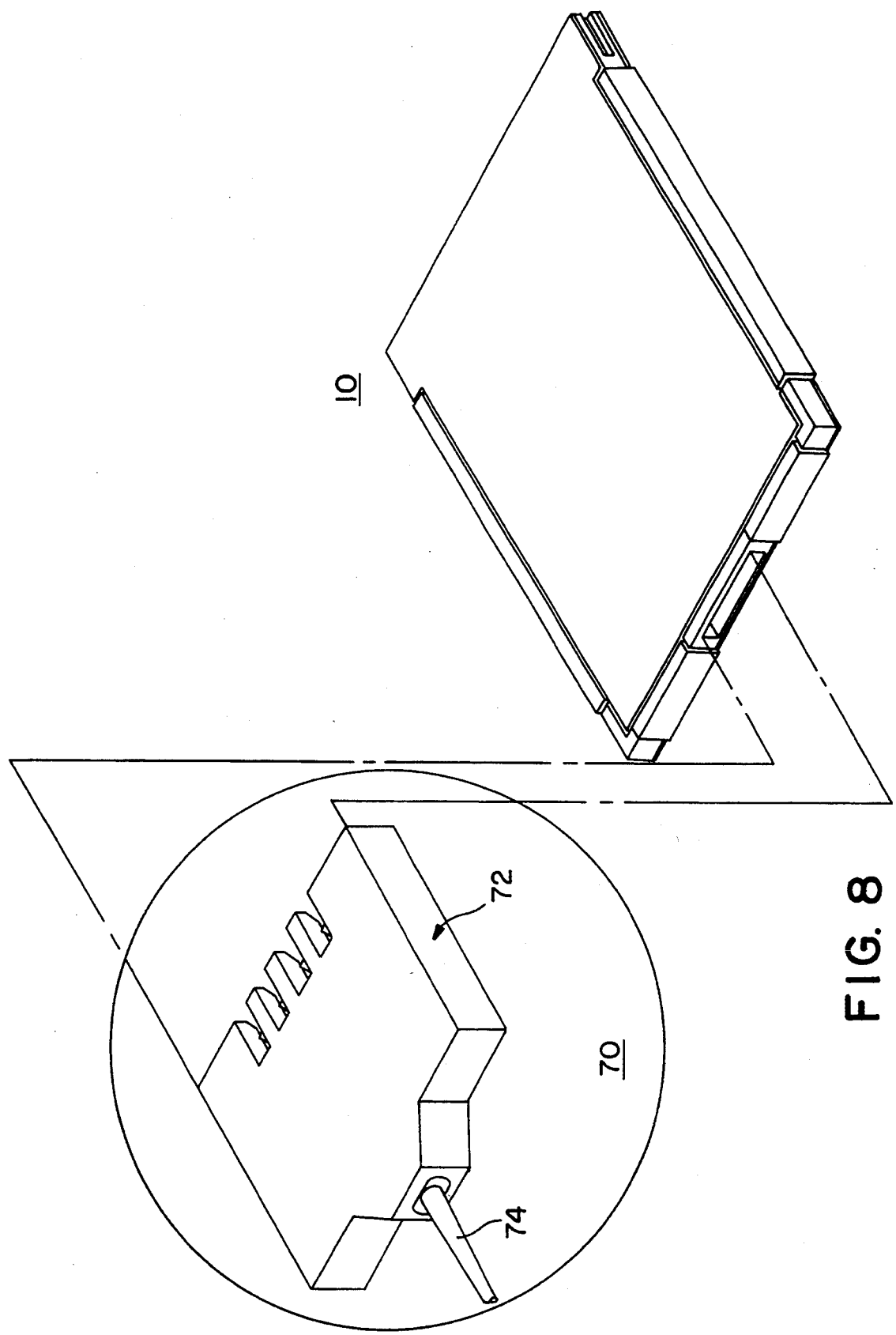
FIG. 8 is a perspective view of an I/O cable connector which is shown to be received within an opening at the I/O end of the IC card of FIG. 2.
Figure 9:
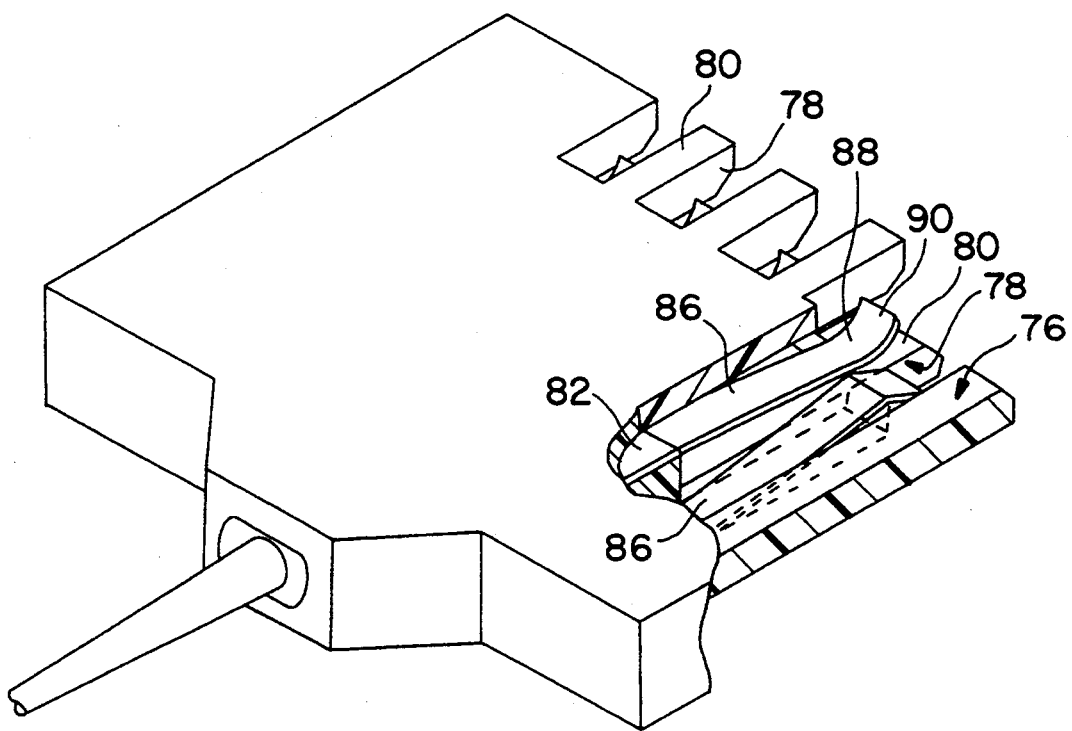
FIG. 9 is a fractional cut-away perspective view of the cable connector of FIG. 8 to show the staggering upper and lower row contacts.
Figure 10A:
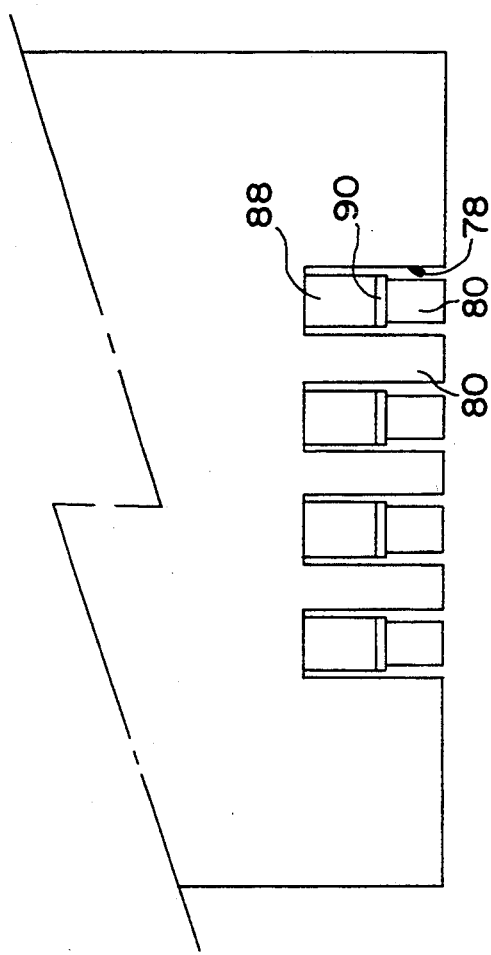
FIG. 10(A) is a fractional top view of the cable connector of FIG. 9.
Figure 10C:
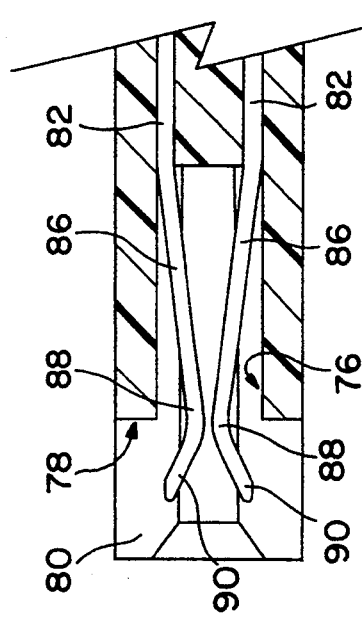
FIG. 10(C) is a fractional cross-sectional view, taken along lines 10—10, of the cable connector of FIG. 9.
Figure 10B:
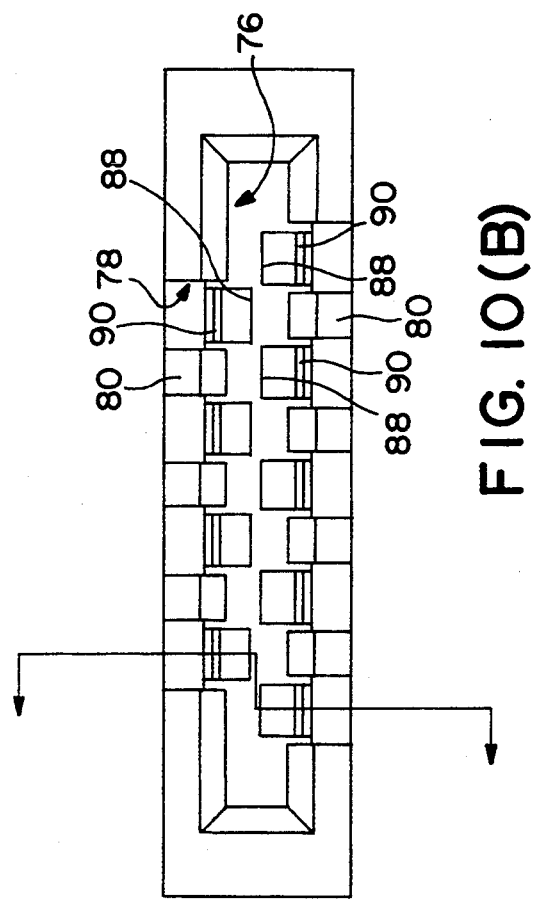
FIG. 10(B) is a front view of the cable connector of FIG. 9.

A pair of recesses 30 are respectively positioned approximate two rear ends of the two side walls 16 for reception therein of two mounting ears 32 of a standard 68 pins socket connector 34 which is mounted on the rear end region of the PC board 26, also referring to FIG. 7. Opposite to each recess 30 is disposed a channel 36 (only one shown) at the rear end of each side wall 16. The channels 36 may combine with locating edges or guiding pins within the computer, to guide the I/O card inserted into the computer, and to align the socket connector 34 with the memory card connector (not shown) mounted on the mother board in the computer.

Figure 4:
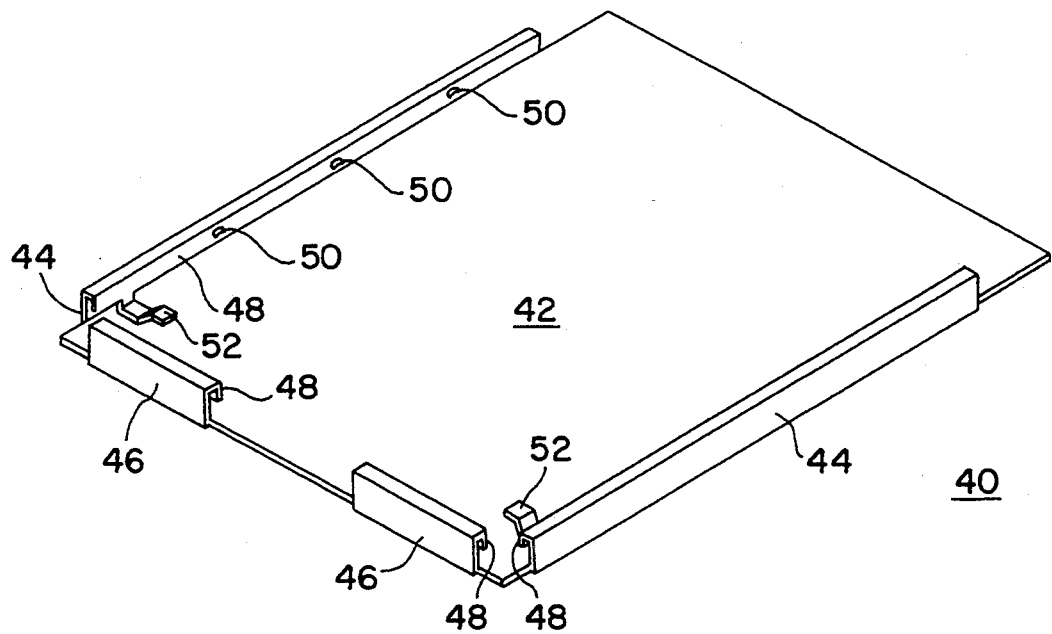
FIG. 4 is a perspective view of the bottom panel of the IC card of FIG. 1.

The bottom surface of the auxiliary frame 18 is flush with the bottom surface of the main frame 12 so a bottom panel 40 can be supported by abutment against the bottom surfaces of the main frame 12 and the auxiliary frame 18. Referring to FIG. 4, vertically extending respectively from the edges of a main plate 42 of the bottom panel 40 are two (first) side shields 44 and two (first) front shields 46 for shielding most portions of the front wall 14 and the side walls 16 of the main frame 12. It can be seen that the height of the shield 44 or 46 is substantially equal to that of the corresponding wall of the main frame so that such shield 44 or 46 covers the corresponding wall 12 or 14 completely in a vertical direction. Moreover, a hook section 48 downward projects from the top of each side shield 44 or the front shield 46. A plurality of detents 50 are formed spaced apart from one another along the side shields 44 and the front shield 46. Correspondingly, as shown in FIGS. 1 and 3, the main frame 12 has two spaced elongated facing-up groove 38 in and along the front wall 14 and two side wall 16 to receive the hook section 48 of each shield 44 or 46 therein, and thus the bottom panel 40 generally securely encloses the main frame 12 and its associated auxiliary frame 18.

It can be understood that in this embodiment, insert molding technology is applied thereto to assemble the frames 12 and 18 with the bottom panel 40, so a grounding fingers 52 are also availably integrally formed with the bottom panel 40 by integrally extending from the hook sections 48 of the bottom panel 40. Such grounding fingers are brought into contact with the bottom surface of the PC board 26 when the whole I/O card is assembled for grounding. Alternately, in this embodiment of the present invention, the traditional molding method of the frames 12 and 18 and assembling method of the bottom panel 40 thereon by bending or clamping procedure may also be feasible to combine the main frame 12 and its associated auxiliary frame 18 to the bottom panel 40 if the grounding fingers 52 are removed from the hook sections 48.

Figure 5:
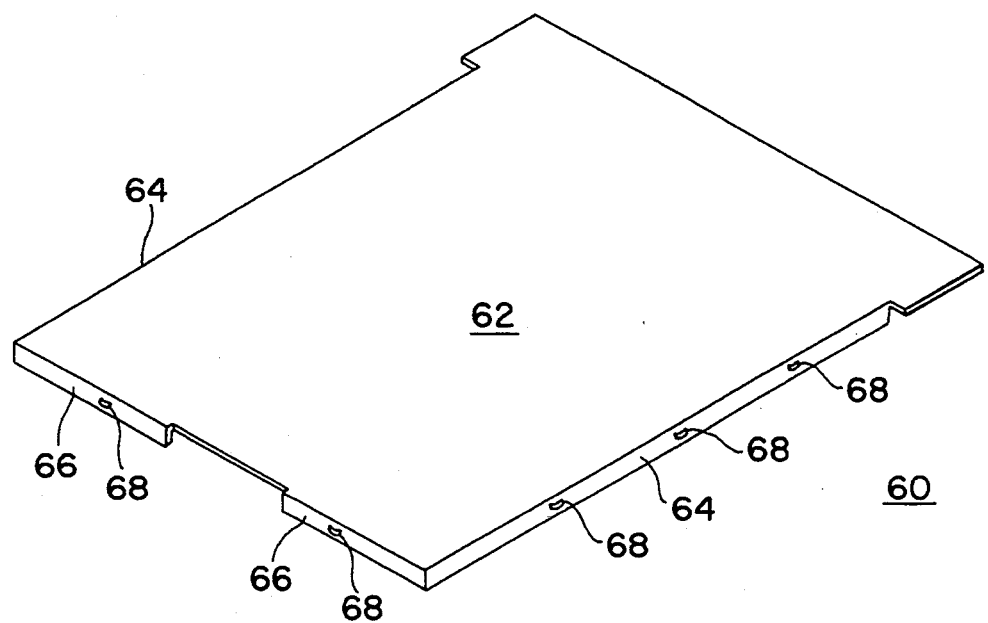
FIG. 5 is a perspective view of the top panel of the IC card of FIG. 1.

Referring to FIGS. 1 and 5, a top panel 60 is attached on the top of the assembled frames 12, 18 and the bottom panel 40. The top panel 60 includes a top plate 62 parallel to the bottom plate 42 of the bottom panel 40. The top panel 60 also includes two (second) side shields 64 and two (second) front shields 66 downward extending respectively from edges of the top plate 62. It can be appreciated that the height of the shield 64, 66 is equal to or less than the depth of the groove 38 of the main frame 12. Corresponding to the bottom panel 40, the top panel 60 also includes a plurality of projections 68 positioned spaced from one another along the shields 64, 66 for retainable engagement within the detents 50 of the bottom panel 40 so that the top panel 60 can be properly retainable assembled to the assembled frames 12, 18 and the bottom panel 40.

Figure 6:
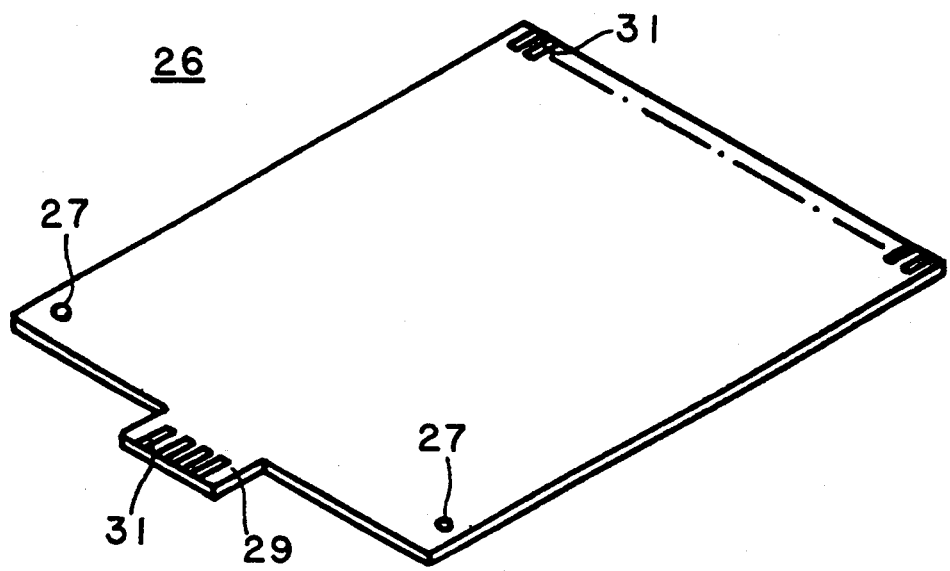
FIG. 6 is a perspective view of the PC board of the IC card of FIG. 1.

As aforementioned and as shown in FIGS. 1, 3 and 6, the PC board 26 is seated on the auxiliary frame 18, and thus naturally positioned between the top panel 60 and the bottom panel 40 when the I/O card 10 is assembled. To align and position the PC board 26 onto the auxiliary frame 18, a pair of bosses 25 may be disposed on the top of the auxiliary frame 18 to be cooperatively received in another pair of apertures 27 in the PC board 26. The board 26 may be bonded onto the frames 12, 18 with an epoxy or other adhesive to firmly attach these two pieces together.

A specifically shaped opening 21, generally rectangular shape, is formed in the middle portion of the front wall 14 of the main frame 12. It can be understood that the shape of the opening 21 complies with the outer profile of the external cable connector which will be depicted in detail later. The PC board 26 has a middle projecting section 29 at its front edge region in alignment with the opening 21 in the frame 12. Therefore, the projecting section 29 of the PC board 26 is substantially positioned at the central position in the vertical direction in the opening 21. It can be contemplated that the PC board 26 usually has a number of electronic device (not shown) attached thereto. The PC board 26 has a plurality of leads (not shown) that terminate at traces or holes 31 generally at two opposite front and rear ends. In this embodiment, referring to FIG. 7, the standard 68 pins socket connector 34 is of surface mount type such that the tails 33 of its contacts 35 are soldered on the corresponding traces 31 of the board 26. It is seen that by means of mounting ears 32 received within the recesses 30 of the main frame 12, the socket connector 34 can be retained with regard to the main frame 12 without horizontal or downward movements. Moreover, the top panel 60 restrains the socket connector 34 from upward moving so that the socket connector 34 is fixed in position when the I/O card is assembled.

With reference to FIGS. 8, 9 and 10(A)-(C), the external cable connector 70 has a housing 72 connected to an external cable 74 at the rear end. The dimension and configuration of the housing 72 in a front view is conformable to those of the opening 21 in the I/O card 10. The housing 72 includes an central cavity 76 extending into the housing 72 from the front surface, the width of which is substantially equal to that of the projection section 29 of the PC board 26 in the opening 21 of the I/O card 10. Two rows of recesses 78 are respectively positioned by two sides of the front portion of the central cavity 76 and along the front edge portion of the housing 72 in a mutually staggering arrangement. Disposed between every two adjacent recess 78 is the partition wall 80 which is in a vertical direction aligned with the corresponding opposite and spaced recess 78 in the condition that the dimension of the partition wall 80 is somewhat smaller than that of the recess 78. It is noted that the length of the recess 78 is generally one-third of that of the cavity 76 in the front-to-end direction. Also, the recess 78 is in communication with the front portion of the central cavity 76 and is completely open to the outside in a vertical direction.

Terminals 82 are respectively received in the passageways 84 in the housing 70 and in respective alignment with the corresponding recesses 78. The front portion 86 of the terminal 82 is of a blade type and extends obliquely and inwardly to the centerline to form a converging section 88, and is successively deflected outwardly to form a diverging section 90 for guiding the front edge of the projecting section 29 of the board 26 when it is inserted into the cavity 76 in the connector housing 72.

Figure 11:
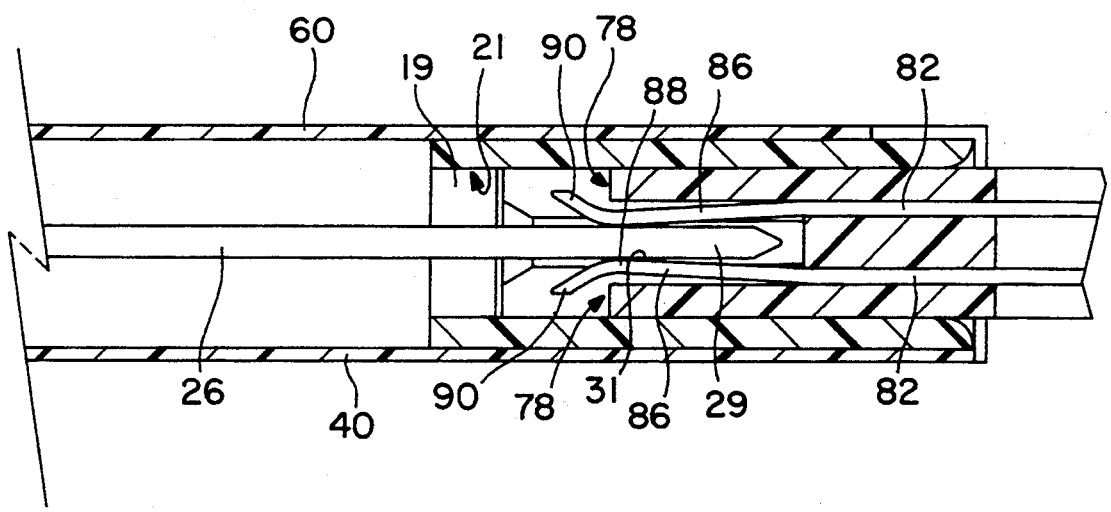
FIG. 11 is a fractional cross-sectional view, also taken along lines 10—10, of the I/O card of FIG. 1 and the mating cable connector of FIG. 9 to show the engagement therebetween.

As shown in FIG. 11, when the cable connector 70 is received within the opening 21 of the I/O card 10, the front edges of the housing 72 of the connector 70 confront the stopping shoulders 19 positioned in the opening 21 for restraining the connector 70 from continuously forward moving. As a result, the front portion of the housing 72 of the cable connector 70 is appropriately, snugly and completely circumscribed in the opening 21 by the front wall 14 of the main frame 12 without tilting so that the projecting section 29 of the board 26 of the I/O card 10 can be accurately in alignment with the centerline of cable connector 70 for precise reception within the housing 72 of the connector 70. At the same time, the front portion 86 of the terminal 82 is biased outwardly by the inserted projecting section 29 of the board 26 of the I/O card 10. In this situation, the diverging section 90 of the front portion 86 of the terminal 82 can retreat and be received in the corresponding recess 78 but the converging section 88 thereof mechanically and electrically engages the corresponding mating trace 31 on the projecting section 29 of the board 26 for signal transmission.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. An I/O card for use with a complementary card edge cable connector connected to an external cable, comprising:

a main frame including at least a front wall;

a PC board mounted in a space formed in said main frame with electrical devices thereon, a projecting section forwardly extending from a middle portion of a front edge region of said PC board wherein a plurality of traces are presented on at least one surface of said projecting section;

a socket connector mounted to a rear end of said main frame, with contact tails electrically connected to said board, for mating an external memory card connector which is mounted on a mother board in a computer;

panel means attached to said main frame for enclosing said PC board therein; and a specifically shaped and dimensioned opening formed through the front wall in a front-to-end direction for reception of the projecting section therein whereby said cable connector can be conformably received in said opening in said I/O card and said projecting section can be conformably received in a central cavity of said cable connector for retainable mechanically and electrically engaging terminals of said cable connector;

wherein said panel means includes a pair of top and bottom panels respectively attached to the main frame on top and bottom sides, said main frame has generally a U-shaped configuration including the front wall and two side walls, and the bottom panel includes front and side shields covering the corresponding front and side walls of the main frame completely in a vertical direction.

2. The I/O card as described in claim 1, wherein at least a groove extends along said front wall and the side walls of the main frame, and hook portions extend from the top of the shields of the bottom panel so that the bottom panel can securely envelop the main frame therein by reception of the hook portions of the bottom panel within the groove of the main frame.

3. The I/O card as described in claim 2, wherein said bottom panel further comprises a plurality of detents formed on the hook portions to capture projections formed on the top panel for fastening the top panel to an assembly of the main frame and the bottom panel.

4. The I/O card as described in claim 1, wherein an auxiliary frame is disposed in said space formed by the main frame, and said PC board is mounted on said auxiliary frame.

5. The I/O card as described in claim 1, wherein said traces are arranged staggeringly on two opposite surfaces of said projecting section of said PC board.

6. An I/O card for use with an card edge connector connected to a peripheral through a cable in a computer system, comprising:

a generally U-shaped main frame including a front wall and two side walls, at least a groove extending along said main frame;

an auxiliary frame integrally formed in a space defined by said main frame;

a PC board fastened to said auxiliary frame with electrical devices thereon, a projecting section forwardly extending from a middle portion of a front edge region of said PC board wherein a plurality of traces are provided on at least one surface of said projecting section;

a socket connector mounted to a rear end of said main frame, with contact tails electrically connected to said PC board, for mating an external memory card connector which is mounted on a mother board in a computer;

a bottom panel including a bottom plate from which first front and side shields extending upwardly from edges of said bottom plate, heights of said first shields being substantially equal to those of the walls of the main frame, hook portions formed at the top of said first shields for reception within said groove in the main frame so that the main frame and its associated auxiliary frame can be securely covered by said bottom panel in a vertical direction; and a top panel including a top plate, and second front and side shields extending downward from edges of said top plate, a height of said second shields being substantially equal to or less than a depth of said groove, a plurality of projections formed along said second front and side shields for engagement with a plurality of corresponding detents of the bottom panel so that the top panel can be attached to said main frame and said bottom panel.

7. The I/O card as described in claim 6, wherein an opening is formed in the front wall of said main frame, and said projecting section of the PC board extends into said opening whereby said card edge connector can be stably and conformably received within said opening, and the projecting section of said PC board can be stably and conformably received within a central cavity defined by a housing of said card edge connector so that the traces on the projecting section can mechanically and electrically engage terminals of said card edge connector, correspondingly.

8. The I/O card as described in claim 7, wherein said traces are arranged staggeringly on two opposite surfaces of said projecting section of said PC board, and said card edge connector includes two rows of recesses staggering with each other on two opposite sides of said central cavity of the card edge connector, a length of each recess being generally one-third of that of said cavity in a front-to-end direction, said recess being in communication with a front portion of the central cavity and being completely open to an exterior in a vertical direction, whereby a diverging section of a front portion of each terminal of said card edge connector can be deflectably received in the corresponding recess in said card edge connector when said card edge connector is mating within said I/O card.

9. Connecting mechanism for connecting an I/O card to a peripheral in a computer system, comprising:
a card edge connector connected to said peripheral through a cable, said card edge connector including a housing defining a central cavity, at least one row of terminals arranged by one side of said cavity in said card edge connector, said terminals at rear ends electrically connected to conductors of said cable;
said I/O card including a main frame defining at a front end a specific shape and dimension of an opening extending through said main frame in a front-to-end direction, the shape and the dimension of said opening being conformable to those of the housing of said card edge connector so that the housing of said card edge connector can be conformably and snugly received within said opening of the I/O card without risks of tilting; and
a projecting section extending forwardly from a portion of a front edge region of a PC board which is enclosed in said I/O card, said projecting section positioned within the opening of the I/O card and being conformable to and aligned with the central cavity of said card edge connector when the I/O card and the card edge connector are interconnected to each other, at least one row of traces presented on at least one surface of said projecting section of the PC board for respective electrical and mechanical engagement with the corresponding terminals of the card edge connector during connection.

10. The connecting mechanism as described in claim 9, wherein said traces are arranged staggeringly on two opposite surfaces of said projecting section of said PC board, and said card edge connector includes two rows of recesses staggering with each other on two opposite sides of said central cavity of the card edge connector, a length of each recess being shorter than that of said cavity in a front-to-end direction, said recess being in communication with a front portion of the central cavity and being completely open to an exterior in a vertical direction, whereby a diverging section of a front portion of each terminal of said card edge connector can be deflectably received in the corresponding recess in said card edge connector when said card edge connector is mating within said I/O card.

11. The connecting mechanism as described in claim 10, wherein said I/O card further comprises at a rear end a socket connector opposite to said opening for mating with a memory card connector mounted on a mother board for communication in a computer.

* * * * *